Nov. 20, 1934.  L. D. SOUBIER  1,981,637
MACHINE FOR FORMING HOLLOW GLASSWARE
Filed Nov. 1, 1930   5 Sheets-Sheet 1
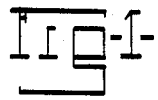
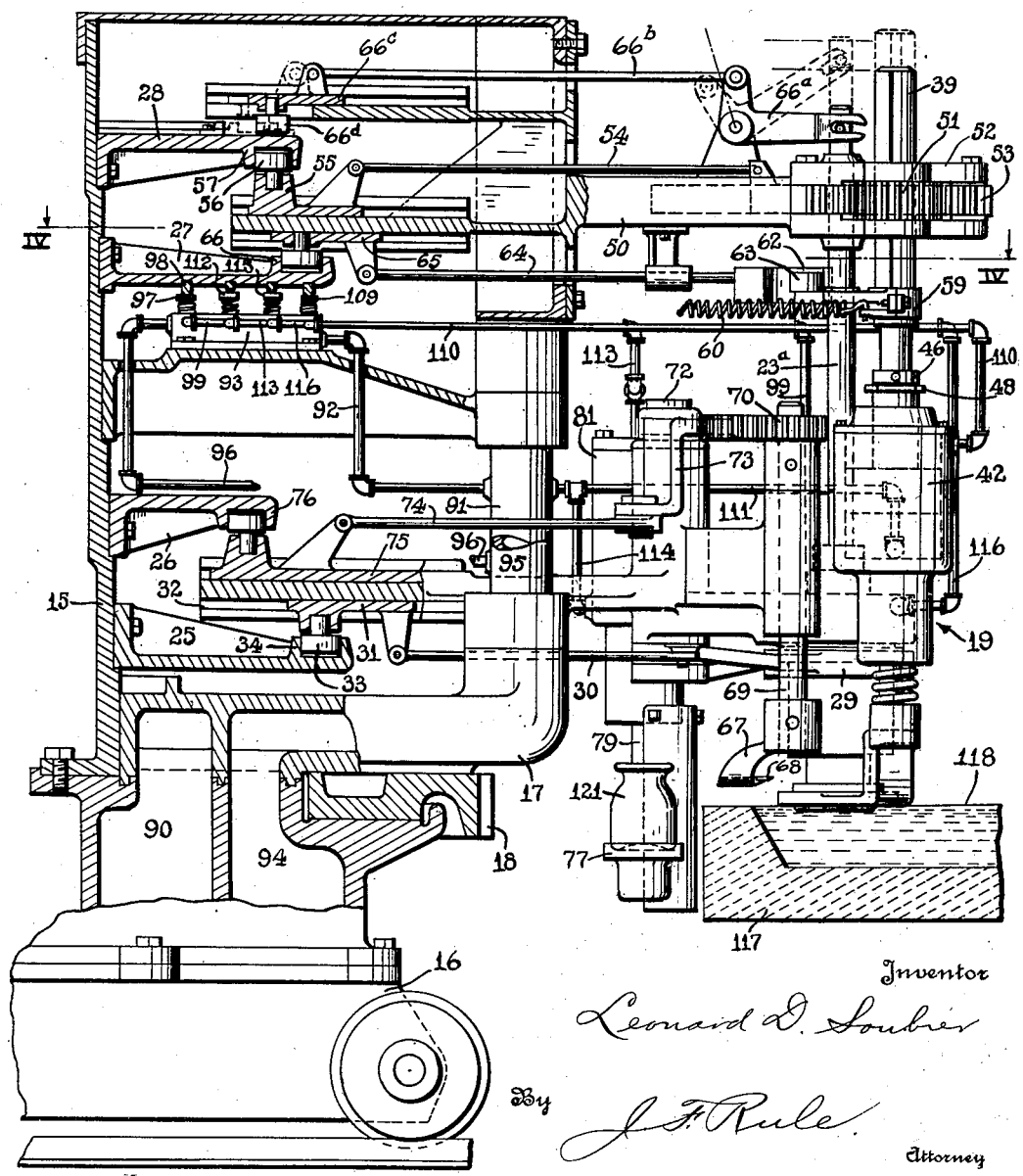
Inventor
Leonard D. Soubier
By J. F. Rule.
Attorney Nov. 20, 1934.   L. D. SOUBIER   1,981,637
MACHINE FOR FORMING HOLLOW GLASSWARE
Filed Nov. 1, 1930   5 Sheets-Sheet 2
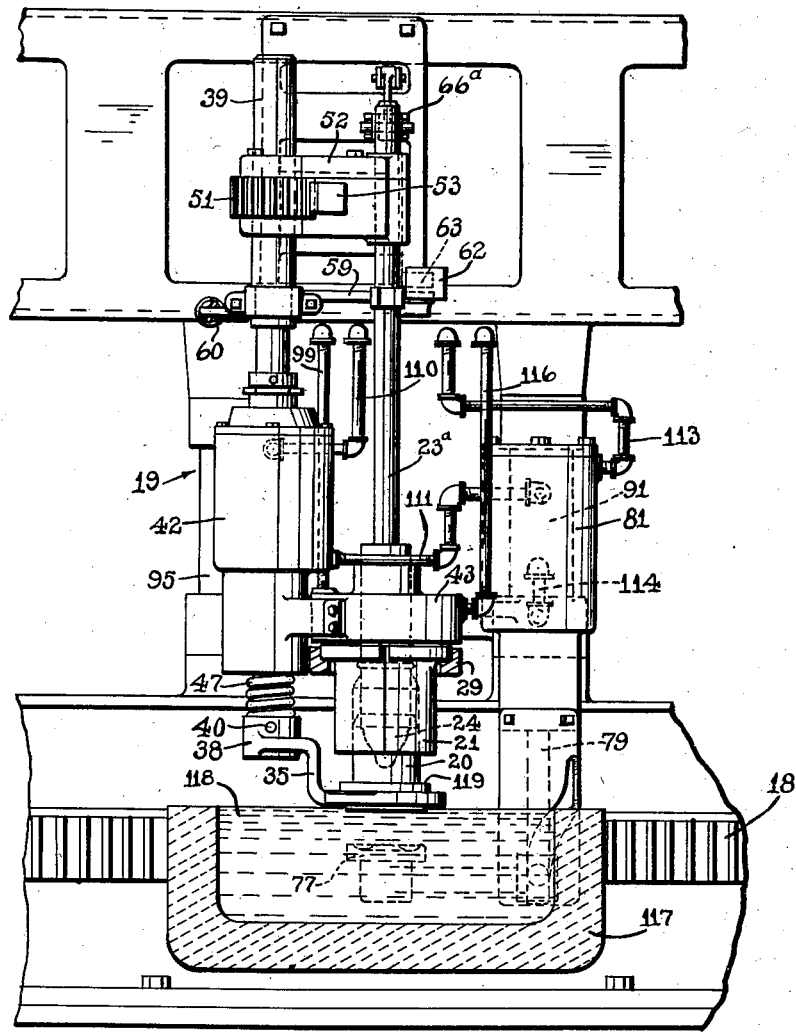
Fig-2-
Inventor
Leonard D. Soubier
By J. F. Rule,
Attorney

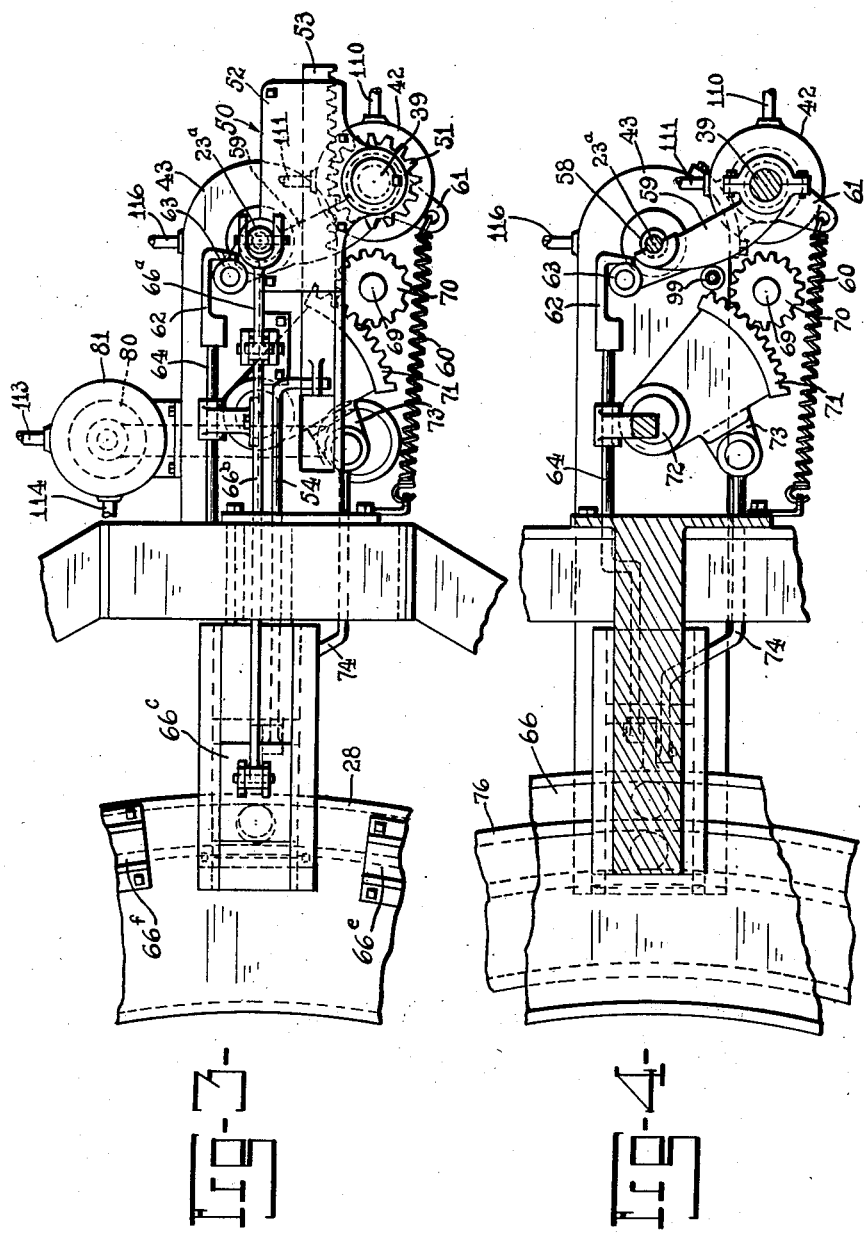

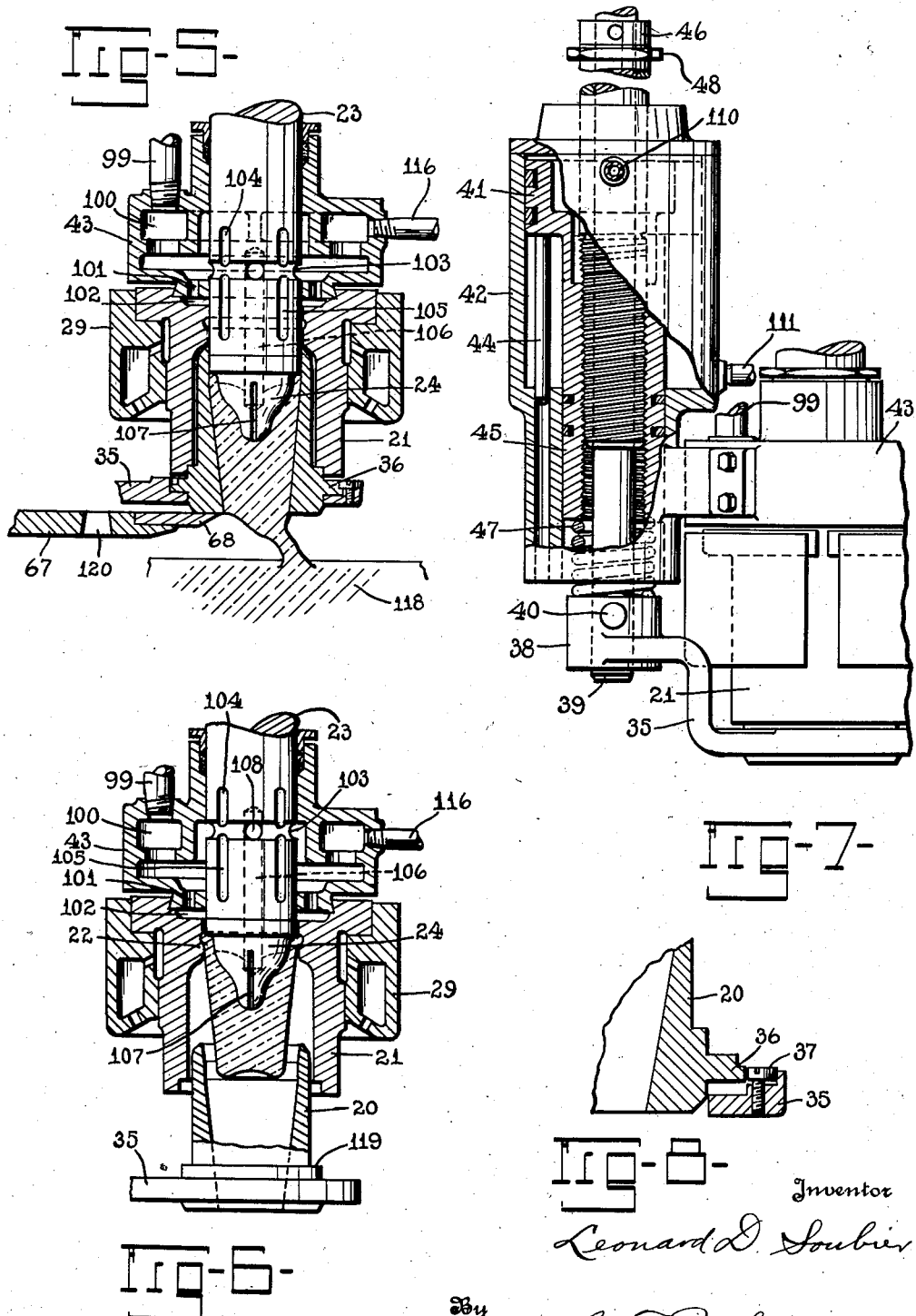

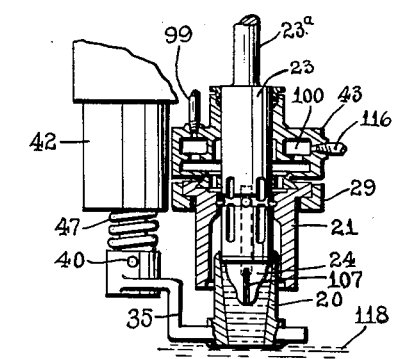
Fig-9-
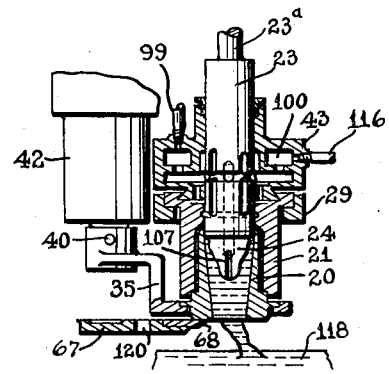
Fig-10-
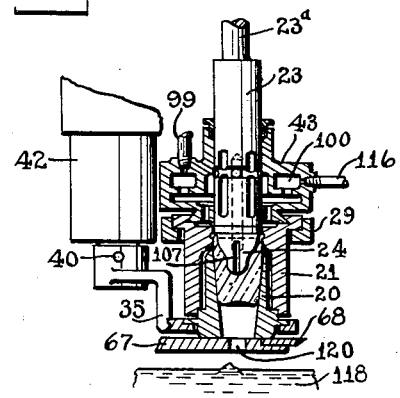
Fig-11-
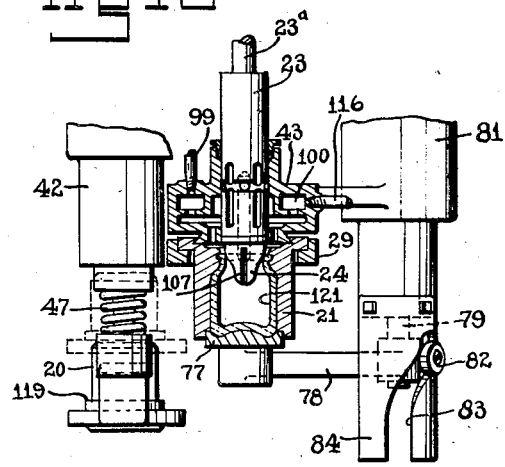
Fig-12-
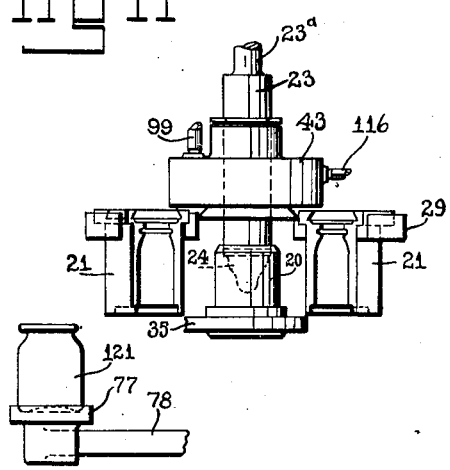
Fig-13-

Patented Nov. 20, 1934

1,981,637

UNITED STATES PATENT OFFICE 1,981,637

MACHINE FOR FORMING HOLLOW GLASSWARE

Leonard D. Soubier, Alton, Ill., assignor to Owens-Illinois Glass Company, a corporation of Ohio Application November 1, 1930, Serial No. 492,711

27 Claims. (Cl. 49—5)

My invention relates to glass blowing machines for making hollow ware such as bottles, jars, and the like. In such machines it is customary to introduce the charges of glass into a parison mold comprising a body blank mold and a separate neck mold in register therewith, give an initial formation to the glass in the molds, then open the blank mold leaving the bare parison supported in the neck mold, then close the finishing mold about the parison and blow the latter to its finished form in the combined neck mold and finishing mold. In making ware on a machine thus constructed, the bare parison is exposed to the air for a substantial length of time, which results in more or less surface chilling of the glass. Sometimes this chilling is excessive, particularly in the manufacture of small ware or wares in which the glass is blown to produce comparatively thin walls.

In making such ware, it is desirable to prevent exposure of the parison or reduce the extent to which it is exposed to the outside air before it has been blown to its final form, and an object of the present invention is to provide means for obtaining this desired result. To this end I have provided a construction in which a finishing mold encloses or surrounds the parison while the latter is still in the blank mold and the blank mold is withdrawn without exposing the parison to the outside air to an objectionable extent.

With the usual types of machines in which the neck molds and finishing molds are made separate and the finishing mold is closed around the parison for the final blowing operation while the parison is still supported in the neck mold, considerable difficulty is often experienced in accurately aligning the molds. Frequently, the neck mold is more or less offset with respect to the finishing mold. This results in defective ware having offset neck portions.

A feature of my invention consists in forming the neck mold integrally with the finishing mold, thereby greatly simplifying the construction and at the same time overcoming the above mentioned difficulty of maintaining the neck mold in accurate alignment with the finishing mold.

Other objects of the invention will appear hereinafter.

Referring to the accompanying drawings:

Fig. 1 is a sectional elevation showing a portion of a machine constructed in accordance with the present invention.

Fig. 2 is a front elevation of one section or unit of the machine.

Fig. 3 is a plan view of mechanism shown in Fig. 1.

Fig. 4 is a sectional plan view at the line IV—IV on Fig. 1.

Fig. 5 is a detail sectional view showing a mold group and associated mechanism, the parts being shown in the position assumed just after the mold has received its charge.

Fig. 6 is a similar view showing the relation of parts after the parison has been formed and the blank mold partly withdrawn.

Fig. 7 is a part sectional elevation showing the air motor for lifting and lowering the blank mold.

Fig. 8 is a detail showing means for locking the blank mold in its carrying arm.

Figs. 9 to 13 are views showing the molds and associated parts, and illustrate successive steps in the formation of an article. Fig. 9 shows the relation of parts while the blank mold is still in dip immediately after the glass has been drawn into the mold. Fig. 10 shows the blank mold lifted within the finishing mold and the knife advancing to sever the glass. Fig. 11 shows the parts after the knife has made its cutting stroke and the plunger and parison have been moved upward into position to permit the neck of the article to be formed. As shown in Fig. 12, the blank mold has been withdrawn, the mold bottom brought into position and the parison blown to its finished form. Fig. 13 shows the finishing mold opened, the finished article removed and the blank mold brought into register with the plunger.

The machine as herein illustrated comprises a stationary central column 15 supported on a wheeled base 16. A mold carriage 17 is mounted for continuous rotation about the axis of the column 15 and is driven by a motor (not shown) having driving connection with an annular gear 18 on the mold carriage.

Supported on the carriage are heads or units 19 which, as usual, may be symmetrically arranged in an annular series about the mold carriage. Each unit comprises a mold group including a blank mold 20 and a finishing mold 21, the latter formed with an integral neck mold 22. A plunger 23 is provided with a tip 24 to enter the molds and cooperate therewith in shaping the parison, as hereinafter fully set forth.

Mounted on the center column 15 are stationary cam plates or spiders 25, 26, 27, and 28, formed with cams for controlling the movements of various mechanisms, as hereinafter set forth. The finishing mold 21 comprises separable sections mounted on pivoted arms 29 operatively connected through links 30 (Fig. 1) to a slide plate 31 mounted to reciprocate radially of the machine in guides 32 on the mold carriage. A cam roll 33 carried by the slide plate runs in a cam 34 formed on the spider 25, said cam shaped to effect the opening and closing movements of the finishing mold.

The blank or parison mold 20, as herein shown, is made in a single piece and is mounted for vertical reciprocating movement into and out of the finishing mold 21 while the latter is in its closed position. The body portion of the blank mold is substantially cylindrical in external contour and when moved upward within the finishing mold 21 may fill or nearly fill the finishing mold cavity. The blank mold is removably mounted on a rock arm 35 formed at its free end with an annular portion providing an opening through which the lower end of the blank mold protrudes, the mold being formed with an annular flange 36 which seats in a recess in the arm 35. The mold is held to its seat by a screw 37 having an eccentric head to engage over the flange 36. The arm 35 is formed with a head or sleeve 38 (Fig. 7) which fits on a rock shaft 39 and is fixed thereto by a key 40. The rock shaft 39 is moved up and down by an air motor comprising a piston 41 which reciprocates in a cylinder 42 mounted on a suction and blowing head 43. The piston 41 is formed integral with a hollow piston rod 44 provided with internal screw threads to receive a threaded adjusting sleeve 45 mounted on the shaft 39. The sleeve 45 is free for rotative and up and down movement on the shaft 39. A collar 46 keyed to the shaft 39 provides a stop to limit the upward movement of the sleeve on the shaft. A coil spring 47 is mounted on the shaft between the head 38 and the lower end of the piston rod 44. A head 48 on the sleeve 45 provides means for rotating the sleeve and thereby adjusting it up and down within the hollow piston rod 44 and thus adjusting the arm 35 and mold 20 up and down relative to their operating motor.

The shaft 39 is rocked for swinging the blank mold 20 laterally toward and from a position in vertical alignment with the finishing mold, by mechanism which will now be described. The rock shaft 39 extends upward for some distance above the piston motor 41, 42 and has bearings in an arm 50 (Figs. 1 and 3) extending radially of and forming part of the mold carriage. A pinion 51 is splined on the shaft 39 above the arm 50. A plate 52 is bolted to the arm 50 above the pinion 51. A rack 53 in mesh with the pinion 51 is mounted to reciprocate lengthwise of said arm and is connected through a rod 54 with a slide plate 55 carrying a roll 56 running in mesh with a cam 57 formed on the spider 28.

The plunger 23 is periodically connected to the rock shaft 39 for limited up and down movement therewith, by means which will now be described. The plunger shaft 23ª extends upward to a point above the arm 50 and is formed at an intermediate point with an annular groove 58 (see Fig. 4) for locking engagement with an arm or latch 59 which is mounted on the rock shaft 39 for rotative movement thereon and up and down movement therewith. The arm 59 is swung toward the plunger shaft and held in engagement therewith by means of a coil spring 60 attached at one end to a lug 61 on the arm 59 and at its opposite end anchored to the framework of the mold carriage. The latch 59 is released from the plunger rod by means of a hook 62 which engages a roll 63 on the arm 59. Said hook is carried by a rod 64 mounted for lengthwise movement radially of the machine and connected to a slide plate 65 (Fig. 1) carrying a roll running on a cam 66 formed on the spider 27.

When the latch 59 is released from the plunger shaft, the up and down movements of said shaft are controlled independently of the shaft 39 by mechanism including a bell crank lever 66ª (Figs. 1 and 3) mounted on the arm 50. One arm of the bell crank lever has a slot and pin connection with the plunger shaft 23ª and the other arm is connected through a rod 66ᵇ with a slide plate 66ᶜ carrying a roll 66ᵈ adapted to run on a cam including sections 66ᵉ and 66ᶠ (Fig. 3). The cam sections are spaced apart so that the roll 66ᵈ runs free of the cam while the plunger shaft is locked to the shaft 39 for up and down movement therewith.

A knife arm 67 carries a blade 68 (Fig. 5) adapted to shear across the bottom of the blank mold for severing the glass. The knife arm is fixed to a vertical rock shaft 69 (see Figs. 1 and 4) mounted on the mold carriage. A pinion 70 keyed to the shaft 69 runs in mesh with a gear segment 71 mounted on a pivot pin 72. An arm 73 on said segment is connected through a rod 74 to a slide 75 carrying a roll running in a cam 76 formed on the spider 26. Said cam is shaped to impart the desired rocking movements to the knife arm. The spring 47 serves to hold the shaft 39 in its lowermost position relative to the sleeve 45, that is, with the collar 46 seated upon the adjusting member 48. Said spring 47 also permits the knife 68 to bear with a yielding pressure against the bottom of the gathering mold 20 during the shearing operation. The parts may be so set that the said mold will be moved upward slightly against the tension of the spring 47 as the knife shears across the mold, this compression of the spring also serving to hold the plate 67 against the mold.

A bottom plate 77 (see Fig. 12) for the finishing mold is carried on a horizontal rock arm 78 secured to the lower end of a vertical rock shaft 79, which rock shaft is connected for up and down movement, to the piston 80 (Fig. 3) of an air motor 81. A cam roll 82 (Fig. 12) connected to the rock shaft runs in a cam slot 83 formed in a vertically disposed cam plate 84. The cam slot is so shaped that as the rock shaft 79 is moved downward from the Fig. 12 position, the bottom plate 77 is lowered and swung laterally toward the center of the machine and thus carried to the Fig. 1 position so that it will clear the gathering tank as it travels with the mold carriage past the tank.

*Air and vacuum systems*

Referring to Fig. 1, an air chamber 90 in which air under pressure is maintained, communicates with an air pressure supply pipe 91 from which a pipe 92 leads to an air pressure chamber within a valve box 93. A vacuum chamber 94 in which vacuum or air at sub-atmospheric pressure is continuously maintained, is in communication through a vacuum supply pipe 95 and a pipe 96 with a vacuum chamber within the left hand end of the valve box 93. A valve 97 actuated by a stationary cam 98 on the spider 27, controls the supply of vacuum from the valve box to a pipe 99 (see Figs. 1 and 5) extending therefrom to an air chamber 100 in the combined air and vacuum head 43. The head 43 is formed with ports 101 extending through its bottom wall and providing communication between the chamber 100 and a recess 102 in the upper face of the mold 21. The plunger 23 is provided with an annular recess 103. Vertical slots 104 and 105 extend respectively upwardly and downwardly from said recess. The plunger has a central vertical bore 106 extending from the level of the recess 103 downward to kerfs 107 in the plunger tip. Transverse openings 108 (Fig. 6) connect the recess 103 with the vertical opening 106. When the plunger and mold are lowered for gathering a charge as shown in Fig. 9 and the valve 97 (Fig. 1) is opened, the air is exhausted from the chamber 100 and from the blank mold through the passages 101, 102, 104, 103, 108, 106 and 107, so that the blank mold is filled with glass by suction.

The operation of the air motor 41, 42 for lifting and lowering the blank mold is controlled by a valve 109 (Fig. 1) actuated by a cam on the spider 27 for opening and closing the air pressure chamber in the valve box 93 to a pipe 110 which leads to the upper end of the motor cylinder 42. When the valve 109 is opened, air pressure is supplied above the motor piston 41 and moves it downward for lowering the blank mold. Air under pressure is constantly maintained beneath the piston 41, the air being supplied through a pipe 111 extending from the lower end of the cylinder 42 to the pressure pipe 91.

The air motor 81 for actuating the mold bottom 77 is controlled by a valve 112 (Fig. 1) actuated by a stationary cam on the spider 27, said valve controlling the supply of air from the valve box 93 to a pipe 113 leading therefrom to the upper end of the differential piston motor 81. A branch pipe 114 leads from the pipe 111 to the lower end of the motor cylinder 81 and supplies constant air pressure beneath the motor piston.

The supply of air under pressure for blowing the glass in the molds is controlled by a valve 115 (Fig. 1) which opens to a pipe 116 (Figs. 1 and 2) leading from said valve to the chamber 100 in the suction and blowing head.

*Operation*

The operation is as follows:

The mold carriage 17 is rotated continuously, bringing the mold groups in succession over a tank 117 containing a supply body of molten glass 118. When a mold group is brought over the gathering area, the air motor 41, 42 operates under the control of the valve 109 (Fig. 1) to lower the blank mold 20 into dip, as shown in Fig. 9. The plunger 23 is lowered with the blank mold, being at this time locked to the piston rod 39 by the latch 59 (Fig. 4) which is in engagement with the plunger rod 23ª. When the blank mold is brought into sealing contact with the glass, the valve 97 (Fig. 1) is opened by the cam 98 so that suction is applied to the mold and fills it with glass.

After the blank mold has received its charge, the air pressure above the piston 41 is cut off, allowing the constant pressure beneath the piston to move it upward and thereby raise the blank mold to the Fig. 10 position, in which it is nested within the finishing mold 21. An annular shoulder 119 (Fig. 6) on the lower end of the blank mold seats in a corresponding recess in the bottom end of the finishing mold and makes sealing contact therewith as the blank mold completes its upward movement within the finishing mold.

The knife is now operated to sever the glass, this operation being effected by the cam 76 (Fig. 1) operating through the connections heretofore described to rock the knife shaft and cause the knife 68 to shear across the bottom of the blank mold, thereby bringing the knife plate 67 to the Fig. 11 position in which an opening 120 extending through said plate is in register with the blank mold cavity. The latch arm 59 is now released from the plunger rod by the operation of the cam 66 as heretofore described. The cam section 66ᶠ now operates through the rod 66ᵇ and bell crank lever 66ᵃ to draw the plunger upward relative to the molds to the Fig. 11 position (see also Fig. 6) in which it cooperates with the neck mold 22 to define the neck portion of the article. The glass moves upward with the plunger and fills the neck cavity, the vacuum being maintained throughout these operations. Air pressure is now supplied above the piston 41 and lowers the blank mold 20, stripping it from the parison and withdrawing it from the finishing mold. The cam 57 (Fig. 1) now operates through the connections heretofore described, including the rack 53 and pinion 51, to rotate the shaft 39 and thereby swing the blank mold laterally to a position at one side of the finishing mold. The mold bottom 77 is now brought into position by means of the air motor 80, 81 which lifts the rod 79 carrying the mold bottom and under the control of the cam 84 (Fig. 12) swings the mold bottom beneath the suspended parison. The finishing mold is now actuated by its cam 34 and closes around the parison and mold bottom. The vacuum is cut off from the chamber 100 and air pressure supplied to said chamber to blow the parison to its finished form (Fig. 12). After the article is sufficiently cooled and set, the finishing mold 21 opens and the mold bottom 77 is lowered and swung to one side with the finished article 121 thereon.

Modifications may be resorted to within the spirit and scope of my invention.

What I claim is:

1. In a machine for forming hollow glass articles, the combination of a finishing mold, a blank mold nested therein and open at one end to receive a charge of glass, means for drawing molten glass by suction from a pool through said open end into the nested blank mold and forming a parison, means for withdrawing the blank mold and leaving the parison in the finishing mold, and means for blowing the parison in the finishing mold after the blank mold has been withdrawn.

2. In a machine for forming hollow glass articles, the combination of a combined neck mold and finishing mold, a blank mold open at both ends and nested within the finishing mold, means for introducing glass into the blank mold through one end thereof, means for withdrawing the blank mold and causing the glass to pass out of the blank mold through the opposite end thereof, leaving a blank of glass within the finishing mold, means for causing a portion of the blank to enter the neck mold and be shaped therein, and means for expanding the glass within the finishing mold.

3. The combination of a finishing mold, a blank mold open at both ends and nested in the finishing mold, means for drawing molten glass by suction from a pool into the blank mold through one end thereof, means to withdraw the blank mold and cause the glass to pass from the mold through the opposite end thereof, and means to hold the blank of glass in the finishing mold while the blank mold is withdrawn.

4. The combination of a finishing mold, a blank mold nested therein and open at its lower end, means for drawing molten glass by suction from a pool into the blank mold through said open end, a neck mold integral with and forming the upper part of the finishing mold, means to cause a portion of the glass to enter the neck mold, means for withdrawing the blank mold by a downward movement thereof, said neck mold being shaped to hold the blank within the finishing mold while the blank mold is withdrawn, and means for blowing the glass to finished form within the finishing mold.

5. The combination of a finishing mold, a blank mold nested therein and open at both ends, means for drawing a charge of glass by suction into the blank mold through one end thereof, means for stripping the blank mold from the glass by a movement causing the glass to leave the mold through the opposite end thereof and withdrawing the blank mold from the finishing mold, a mold bottom, means to bring it into engagement with the finishing mold, and means to then blow the glass within the finishing mold.

6. The combination of a single piece blank mold open at both ends, a partible finishing mold surrounding the blank mold, means to introduce a charge of glass into the blank mold through one end, means for stripping the blank mold from the glass and causing the glass to leave the blank mold through the opposite end, and means for expanding the glass in the finishing mold.

7. The combination of a single piece blank mold open at both ends, a partible finishing mold surrounding the blank mold, means to introduce a charge of glass into the blank mold through one end while a portion of the blank mold is within the finishing mold, means for stripping the blank mold from the glass and causing the glass to pass from the blank mold through the opposite end and leave the glass in the finishing mold, and means for expanding the glass in the finishing mold.

8. The combination of a single piece blank mold open at both ends, a partible finishing mold surrounding the blank mold, means to introduce a charge of glass into the blank mold through one end while a portion of the blank mold is within the finishing mold, means for stripping the blank mold from the glass and causing the glass to pass from the blank mold through the opposite end and leave the glass in the finishing mold, a mold bottom, means for moving said bottom into position to close the end of the finishing mold, and means for then expanding the glass in the finishing mold.

9. The combination of a blank mold open at both ends, a plunger projecting into the blank mold through one end thereof, a finishing mold surrounding the blank mold and plunger, means for introducing a charge of glass into the blank mold through the other end thereof while the plunger is in said position, means for withdrawing the blank mold and leaving a parison of glass supported within the finishing mold, and means to expand the glass in the finishing mold.

10. The combination of a neck mold and finishing mold, a blank mold nested within the finishing mold, a plunger projecting into the blank mold, means for introducing a charge of glass into the blank mold while the plunger is in said projected position, means for withdrawing the blank mold, means for partially withdrawing the plunger and positioning it to cooperate with the neck mold in forming the neck portion of the article, and means for expanding the article in the finishing mold.

11. The combination of a finishing mold comprising horizontally separable sections, a single piece blank mold open at the top and bottom movable vertically into and out of the finishing mold, means to introduce a charge of glass into the blank mold through the bottom thereof while the blank mold is partly within the finishing mold, means for then separating the blank and finishing molds by a relative vertical movement in a direction to position the blank mold below the finishing mold, and means for expanding the glass in the finishing mold.

12. The combination of a blank mold open at top and bottom, a plunger projecting downward into the blank mold, a partible finishing mold surrounding the blank mold and plunger and enclosing the major portion of the blank mold, means for bringing the blank mold into operative relation to a supply body of molten glass and causing the glass to move upward by suction into the blank mold while the latter is surrounded by the finishing mold, means to sever the glass at the lower end of the blank mold, means to separate the blank mold and finishing mold by a relative vertical movement, leaving the parison of glass supported in the finishing mold, and means for then blowing the parison in the finishing mold.

13. The combination of a finishing mold and a neck mold above the finishing mold, a blank mold open at top and bottom and extending upward into the finishing mold, a plunger projecting downward through the neck mold into the upper end of the blank mold, said plunger having an air passageway extending therethrough, means for exhausting the air through said passageway and thereby introducing a charge of glass by suction into the blank mold through the bottom end thereof, means for withdrawing the plunger upward to a position in which it cooperates with the neck mold to provide a neck cavity and causing a portion of the glass to enter said cavity and form the neck portion of the article, means for then separating the blank mold and finishing mold by a relative vertical movement, and means for expanding the glass in the finishing mold.

14. The combination of a mold carriage, a piston motor comprising a vertical piston rod, a mold carried by said rod, a plunger projecting into the mold, a plunger rod, a latch carried by one of said rods, means for moving said latch into locking engagement with the other of said rods and thereby locking said plunger rod to the piston rod, means for actuating said motor and thereby moving the plunger and mold up and down as a unit, means for withdrawing the latch and thereby releasing the plunger, and means for moving said plunger up and down independently of the mold.

15. The combination with a mold carriage, of a blank mold, finishing mold and plunger mounted on the carriage and relatively positioned with their axes vertical and coincident, the plunger projecting into the blank mold and the blank mold projecting into the finishing mold, means for introducing a charge of glass into the blank mold and forming a blank therein while the molds and plunger are in said relative position, means for then withdrawing the blank mold vertically from the blank, and means for blowing the glass to finished form in the finished mold.

16. The combination of a mold carriage rotatable about a vertical axis, a finishing mold and a blank mold on said carriage, each of said molds open at top and bottom, means for periodically positioning the blank mold within the finishing mold, means for drawing a charge of glass upward by suction from a pool of glass into the blank mold through the bottom end thereof, means for withdrawing the blank mold downward and leaving the glass in the finishing mold, and means for expanding the glass in the finishing mold.

17. The combination of a mold carriage rotatable about a vertical axis, a finishing mold and a blank mold on said carriage, each of said molds open at top and bottom, means for periodically projecting the blank mold into the finishing mold, means for introducing glass by suction into the blank mold through the bottom end thereof and forming a blank therein while the blank mold is projected into the finishing mold, means for stripping the blank mold from the blank by a downward movement of the mold relatively to the blank, and means for blowing the blank in the finishing mold.

18. The combination with a mold carriage rotatable about a vertical axis, a container for molten glass, a mold having a fixed mounting on the carriage at a level above that of the container and in position to be carried over the container as the carriage rotates, a gathering mold open at its lower end, means for periodically interposing the gathering mold between said first mentioned mold and the glass in the container, means for drawing glass by suction into the gathering mold through its lower end as it travels over the container, means for supporting the gathered glass and stripping the gathering mold therefrom by a downward movement, and means for blowing the gather of glass within said first mentioned mold.

19. The combination of a mold carriage rotatable about a vertical axis, a blank mold and a finishing mold supported on the carriage in vertical alignment, the blank mold cavity being open through the top and bottom of the mold, a stationary container for molten glass located below the level of the molds and in such position that the molds pass thereover as the carriage rotates, means for lowering the blank mold into contact with the glass as it passes over the container, means for introducing a gather of glass by suction into the blank mold through the lower end thereof, means for causing a vertical upward movement of the blank mold and the charge of glass therein into the finishing mold, means for further moving the glass into a position in which it can be blown in the finishing mold, means for withdrawing the blank mold downward to a position clear of the finishing mold, and means for blowing the glass in the finishing mold.

20. The combination of a mold carriage, a blank mold thereon open at its lower end, means for introducing a mold charge of glass by suction from a supply body into the blank mold through said lower end, means for severing the charge from the supply body, a neck mold above the blank mold, means for bodily moving the charge of glass upward relative to the blank mold after said severance and causing a portion thereof to enter the neck mold, means for then withdrawing the blank mold downward away from the blank, leaving the blank suspended from the neck mold, and means to expand the blank to its finished form.

21. The combination of a mold carriage, a blank mold thereon open at its lower end, means for introducing a mold charge of glass by suction from a supply body into the blank mold through said lower end, means for severing the charge from the supply body, a neck mold above the blank mold, means for bodily moving the charge of glass upward relative to the blank mold after said severance and causing a portion thereof to enter the neck mold, means for then withdrawing the blank mold downward away from the blank, leaving the blank suspended from the neck mold, a finishing mold beneath the neck mold and surrounding the blank, and means for blowing the blank to finished form in the combined neck mold and finishing mold.

22. The combination of a neck mold, a blank mold therebeneath open at top and bottom, a finishing mold, a plunger projecting downward through the neck mold into the blank mold, said plunger formed with an air passageway therethrough, means for bringing the blank mold into operative relation to a pool of molten glass, means for exhausting air through the plunger and drawing a charge of glass by suction into the blank mold through the lower end thereof, means for severing the glass at the bottom of the blank mold, means for moving the plunger upward while the suction is maintained and thereby drawing the charge of glass upward and causing a portion of the glass to enter the neck mold and form the neck portion of the article to be produced, means for withdrawing the blank mold downward to a position clear of the parison of the glass, and means for expanding the glass after the blank mold is withdrawn and giving the article its finished shape.

23. The combination with a mold carriage rotatable about a vertical axis, a container for molten glass, a mold having a fixed mounting on the carriage at a level above that of the container and in position to be carried over the container as the carriage rotates, a gathering member, means for periodically interposing the gathering member between said mold and the glass in the container, means for drawing a gather of glass by suction into the gathering member as it travels over the container, means for severing the gather at a point below the gathering member, means for supporting the gather of glass and withdrawing the gathering member downward therefrom, and means for blowing the gather of glass within said mold.

24. In a machine for forming hollow glass articles, the combination of a blank mold, a finishing mold, means for periodically causing a relative movement of the molds by which the blank mold is nested within the finishing mold, means for bringing the blank mold into operative relation to a supply body of molten glass and introducing a charge of glass by suction thereinto for forming a parison, means associated with the finishing mold for engaging and holding the parison while the blank mold is within the finishing mold, means for withdrawing the blank mold and thereby leaving the parison supported within the finishing mold, and means for expanding the parison to hollow form within the finishing mold.

25. In a machine for forming hollow glass articles, the combination of a blank mold and a finishing mold, each open at both ends, means for periodically causing a relative movement of the molds in the direction of their length and thereby periodically positioning the blank mold alternately within and outside of the finishing mold, means for introducing a charge of glass by suction into the blank mold and forming a parison therein, means for attaching the parison to the finishing mold while the blank mold is nested in the finishing mold and holding the parison while the molds are separated, and means for blowing the parison within the finishing mold.

26. The method which comprises projecting a column of molten glass from a supply body into a mold cavity of greater cross sectional area than said column, leaving an annular space within the mold cavity surrounding said column, severing the column from the supply body, and expanding the column laterally into engagement with the mold cavity walls.

27. The method which comprises projecting a column of molten glass from a supply body into a mold cavity of greater cross sectional area than said column, leaving an annular space within the mold cavity surrounding said column, severing the column from the supply body, applying pneumatic pressure internally of said column and thereby expanding it to hollow form in which the exterior surface of the column engages and conforms to the shape of the mold cavity walls.

LEONARD D. SOUBIER.